US010699667B2

(12) United States Patent
Kasahara et al.

(10) Patent No.: US 10,699,667 B2
(45) Date of Patent: Jun. 30, 2020

(54) DISPLAY APPARATUS AND CONTROL METHOD FOR DISPLAY APPARATUS

(71) Applicant: SEIKO EPSON CORPORATION, Tokyo (JP)

(72) Inventors: Daisuke Kasahara, Shiojiri (JP); Takeshi Furihata, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/170,844

(22) Filed: Oct. 25, 2018

(65) Prior Publication Data

US 2019/0130867 A1 May 2, 2019

(30) Foreign Application Priority Data

Oct. 26, 2017 (JP) ................................ 2017-206888

(51) Int. Cl.

*G06F 13/14* (2006.01)
*G09G 5/00* (2006.01)
*G09G 3/00* (2006.01)
*G09G 3/36* (2006.01)

(52) U.S. Cl.

CPC ............. *G09G 5/006* (2013.01); *G09G 3/002* (2013.01); *G09G 3/36* (2013.01); *G09G 2330/021* (2013.01); *G09G 2354/00* (2013.01); *G09G 2370/20* (2013.01)

(58) Field of Classification Search

CPC .......... H04N 1/00413; H04N 1/00493; G09G 2330/021; G09G 2354/00; G09G 2370/20; G09G 5/006

See application file for complete search history.

(56) References Cited

U.S. PATENT DOCUMENTS

2004/0204139 A1 10/2004 Fujiki et al.
2006/0164561 A1* 7/2006 Lacy .................. H04N 5/44513 348/706
2012/0084479 A1* 4/2012 Hale ..................... G06F 13/409 710/301

FOREIGN PATENT DOCUMENTS

JP 2003-258659 A 9/2003
JP 2010-200223 A 9/2010

* cited by examiner

*Primary Examiner* — Hau H Nguyen
(74) *Attorney, Agent, or Firm* — Oliff PLC

(57) ABSTRACT

A display apparatus includes a plurality of input terminals capable of receiving image signals, a first display part showing whether or not the input terminal accepts the image signal with respect to each input terminal of the plurality of input terminals, an image display unit that displays an image according to the image signal received by a selected input terminal selected from the plurality of input terminals on a display surface, and a second display part showing the selected input terminal.

12 Claims, 10 Drawing Sheets

DISPLAY APPARATUS AND CONTROL METHOD FOR DISPLAY APPARATUS

BACKGROUND

1. Technical Field

The present invention relates to a display apparatus and a control method for the display apparatus.

2. Related Art

A display apparatus including a projector may have a plurality of input terminals. Patent Document 1 (JP-A-2010-200223) discloses a projector showing whether or not each input terminal of the plurality of input terminals accepts an image signal.

However, in the above described display apparatus of related art, it is impossible to let a user know which input terminal of the input terminals accepting image signals has received an image signal on which an image being displayed is based.

SUMMARY

An advantage of some aspects of the invention is to make it possible to let a user know which input terminal of input terminals accepting image signals has received an image signal on which an image being displayed is based.

A display apparatus according to a preferred aspect (first aspect) of the invention includes a plurality of input terminals capable of receiving image signals, a first display part showing whether or not the input terminal accepts the image signal with respect to each input terminal of the plurality of input terminals, the image display unit that displays an image according to an image signal received by a selected input terminal selected from the plurality of input terminals on a display surface, and a second display part showing the selected input terminal.

According to the aspect, the first display part shows which of the plurality of input terminals accepts the image signal and the second display part shows the selected input terminal. Accordingly, it may be possible to let a user know the input terminal to which the image signal on which an image being displayed is based is input of the input terminals accepting the image signals.

In a preferred example (second aspect) of the first aspect, the first display part has a third display part with respect to each input terminal, the third display part indicates whether or not the input terminal corresponding to the third display part accepts the image signal, the second display part has a fourth display part with respect to each input terminal, and the fourth display part indicates whether or not the input terminal corresponding to the fourth display part is the selected input terminal.

According to the aspect, the user can easily recognize whether or not each input terminal accepts the image signal and whether or not each input terminal is the selected input terminal.

In a preferred example (third aspect) of the second aspect, the third display part is a first light emitting part, and the display apparatus further includes a first light emission control part that lights the first light emitting part when the input terminal corresponding to the first light emitting part accepts the image signal and extinguishes the first light emitting part when the input terminal corresponding to the first light emitting part does not accept the image signal.

According to the aspect, the first light emitting part corresponding to the input terminal accepting the image signal is lit, and thereby, the user can easily know the input terminals accepting the image signals of the plurality of input terminals by recognizing the lit first light emitting parts.

In a preferred example (fourth aspect) of the second aspect or third aspect, the fourth display part is a second light emitting part, and the display apparatus further includes a second light emission control part that lights the second light emitting part when the input terminal corresponding to the second light emitting part is the selected input terminal and extinguishes the second light emitting part when the input terminal corresponding to the second light emitting part is not the selected input terminal.

According to the aspect, the second light emitting part corresponding to the selected input terminal is lit, and thereby, the user can easily know the selected input terminal.

In a preferred example (fifth aspect) of the second aspect, the third display part is a first light emitting part, and the fourth display part is a second light emitting part, the display apparatus further includes a light emission control part that lights the first light emitting part when the input terminal corresponding to the first light emitting part accepts the image signal and lights the second light emitting part when the input terminal corresponding to the second light emitting part is the selected input terminal, and a lighting command receiving part that receives a lighting command to light the first light emitting part and the second light emitting part, and, when the lighting command receiving part receives the lighting command, the light emission control part lights at least one of the first light emitting part corresponding to the input terminal not accepting the image signal and the second light emitting part corresponding to the input terminal not the selected input terminal in predetermined colors, and the predetermined color in the first light emitting part is a different color from a color of light emitted by the first light emitting part corresponding to the input terminal accepting the image signal, and the predetermined color in the second light emitting part is a different color from a color of light emitted by the second light emitting part corresponding to the selected input terminal.

In the case where the display apparatus is located in a dark place, it may be harder to visually recognize the third display parts and the fourth display parts. According to the aspect, at least ones of the third display parts corresponding to the input terminals to which the image signals are not input and the fourth display parts corresponding to the non-selected input terminals are lit to emit lights having predetermined colors, and thereby, the third display parts and the fourth display parts can be easily visually recognized. Further, the predetermined color in the first light emitting part is the different color from the color of light emitted by the first light emitting part corresponding to the input terminal accepting the image signal, and the predetermined color in the second light emitting part is the different color from the color of light emitted by the second light emitting part corresponding to the selected input terminal. Therefore, the lights in the predetermined colors are emitted, and thereby, the user may know that the input terminal corresponding to the first light emitting part lit in the predetermined color does not accept the image signal and the input terminal corresponding to the second light emitting part lit in the predetermined color is not the selected input terminal.

In a preferred example (sixth aspect) of the second aspect, the third display part is a first light emitting part, and the fourth display part is a second light emitting part, the display apparatus further includes a light emission control part that lights the first light emitting part when the input terminal corresponding to the first light emitting part accepts the image signal and lights the second light emitting part when the input terminal corresponding to the second light emitting part is the selected input terminal, and an extinction command receiving part that receives an extinction command to extinguish the first light emitting part and the second light emitting part, and, when the extinction command receiving part receives the extinction command, the light emission control part extinguishes the first light emitting part corresponding to the input terminal accepting the image signal and the second light emitting part corresponding to the selected input terminal.

According to the aspect, the location in which the display apparatus is installed is desired to be darker, the first light emitting part corresponding to the input terminal accepting the image signal and the second light emitting part corresponding to the selected input terminal may be extinguished and the location in which the display apparatus is installed can be made darker.

In a preferred example (seventh aspect) of the second aspect to the sixth aspect, the fourth display part is placed adjacent to the third display part corresponding to the input terminal corresponding to the fourth display part.

According to the aspect, the third display parts and the fourth display part corresponding to the input terminal corresponding to the third display part are placed adjacent to each other, and thereby, the user may know whether or not the input terminal accepts the image signal and whether or not the input terminal is the selected input terminal at a glance.

In a preferred example (eighth aspect) of the second aspect to the seventh aspect, the display apparatus further includes a setting information receiving part that receives setting information representing one or more input terminals of the plurality of input terminals, and the third display part corresponding to the input terminal represented by the setting information stops indication as to whether the input terminal accepts the image signal.

According to the aspect, the third display parts designated to be extinguished by the user may be extinguished, and thereby, power consumption can be reduced.

In a preferred example (ninth aspect) of the second aspect to the eighth aspect, the display apparatus further includes a determination part that determines whether or not each input terminal accepts the image signal, and a cycle information receiving part that receives cycle information representing a cycle in which whether or not the input terminal accepts the image signal is determined, and the determination part determines whether or not each input terminal accepts the image signal according to the cycle represented by the cycle information received by the cycle information receiving part.

According to the aspect, whether or not the input terminal accepts the image signals is determined according to the cycle designated by the user, and thereby, determination can be made at an appropriate frequency according to the states of the image signal and the display apparatus.

In a preferred example (tenth aspect) of the second aspect to the ninth aspect, the image signal contains a plurality of pieces of information on an image according to the image signal, the display apparatus further includes a determination part that determines whether or not each input terminal accepts the image signal, and the determination part determines that the input terminal accepts the image signal when the input terminal receives part of the plurality of pieces of information.

According to the aspect, the determination is made by part of information without determination as to whether or not all of the plurality of pieces of information contained in the image signal are contained, and thereby, load on the determination part can be suppressed.

In a preferred example (eleventh aspect) of the second aspect to the tenth aspect, the display apparatus further includes a first generation part that generates image information representing an image showing whether or not each input terminal accepts the image signal, and the image display unit displays the image represented by the image information generated by the first generation part on the display surface.

According to the aspect, even in the case where it is impossible for the user to visually recognize the first display parts, the user can view the image displayed on the display surface and determine whether or not the input terminals accept the signals.

In a preferred example (twelfth aspect) of the second aspect to the eleventh aspect, the display apparatus further includes a second generation part that generates image information representing an image showing information on the image signal received by the input terminal, and a fifth display part that displays the image represented by the image information generated by the second generation part.

According to the aspect, the user may know information on the image that can not be known from the first display parts.

In a preferred example (thirteenth aspect) of the second aspect to the twelfth aspect, the display apparatus further includes a slot that enables insertion and ejection of a board, and the plurality of input terminals include an input terminal of the board inserted into the slot.

According to the aspect, the user may easily know whether or not the input terminal of the board inserted into the slot included in the plurality of input terminals accepts the image signal and whether or not the input terminal is the selected input terminal.

A control method for a display apparatus according to a preferred aspect (fourteenth aspect) of the invention is a control method for a display apparatus having a plurality of input terminals capable of receiving image signals, including showing whether or not the input terminal accepts the image signal with respect to each input terminal of the plurality of input terminals, displaying an image according to the image signal received by a selected input terminal selected from the plurality of input terminals on a display surface, and showing the selected input terminal.

According to the aspect, the display apparatus shows to which of the plurality of input terminals the image signal is input and the selected input terminal. Accordingly, it may be possible to let a user know the input terminal to which the image signal on which an image being displayed is based is input of the input terminals accepting image signals.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments for implementation of the invention will be explained with reference to the drawings. Note that, in the respective drawings, dimensions and scales of the respective parts are appropriately made different from real ones. Further, the embodiments to be described are preferred specific examples of the invention and have various technically preferable limitations, however, the scope of the invention is not limited to these embodiments in the absence of particular limitations on the invention in the following explanation.

First Embodiment

Figure 1:
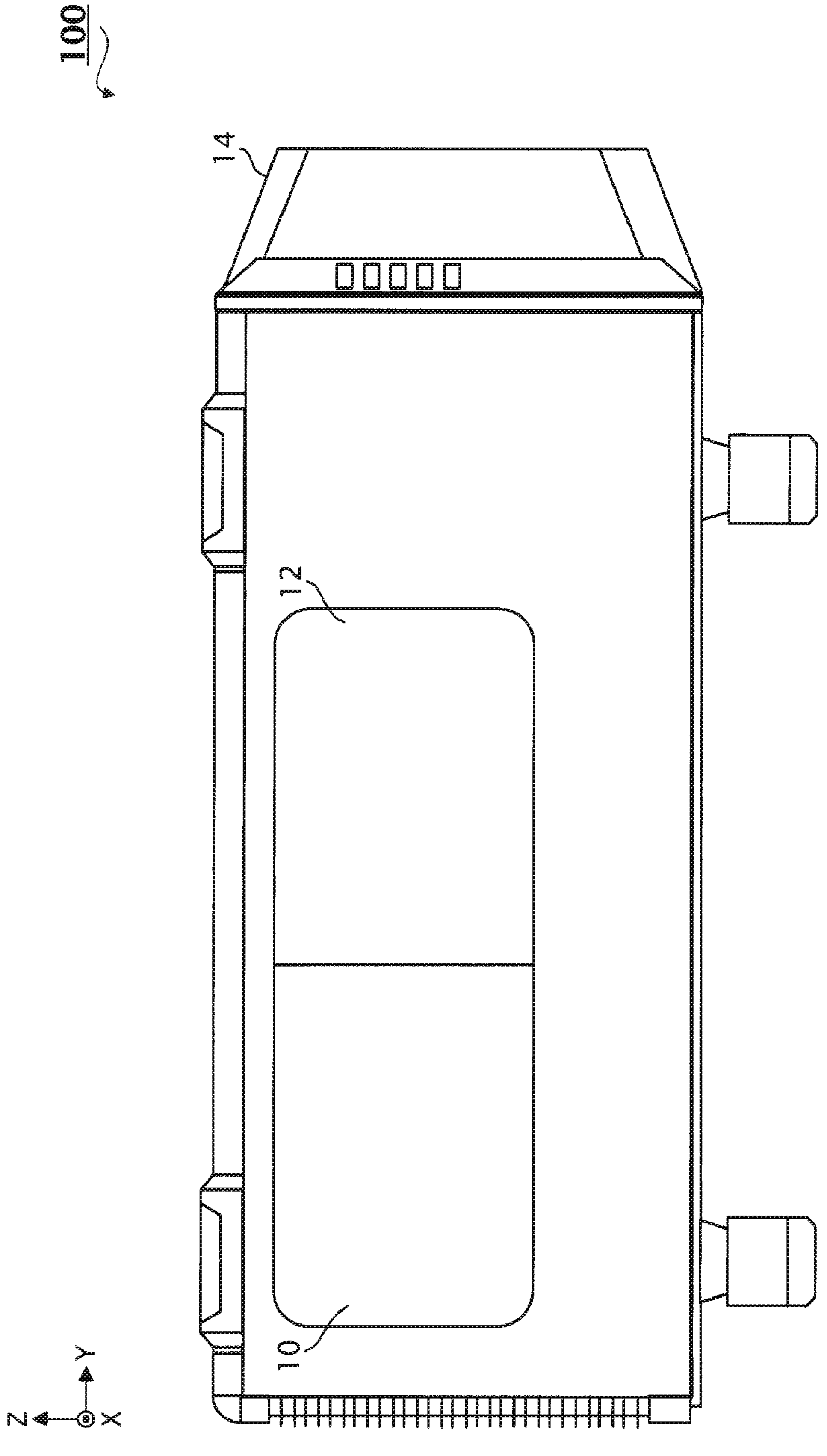
FIG. 1 is a side view of a projector 100 according to a first embodiment.

FIG. 1 is a side view of a projector 100 according to the first embodiment. The projector 100 (an example of a display apparatus) projects an image (hereinafter, referred to as "projection image") on a projection surface SC (an example of a display surface) shown in FIG. 4. The projector 100 has an interface panel 10, an operation panel 12, and a projection lens unit 14. As shown in FIG. 1, the interface panel 10 and the operation panel 12 are located on a side surface of the projector 100. The projection lens unit 14 is located on the front surface of the projector 100.

In the interface panel 10, a plurality of interfaces of the projector 100 are provided. In the operation panel 12, various buttons etc. for operation to the projector 100 are provided. The projection lens unit 14 includes a projection lens 323 (see FIG. 6).

In the following explanation, directions parallel to the optical axis of the projection lens 323 are referred to as Y-directions. Regarding the Y-directions, the direction from the center of the projector 100 toward the projection lens unit 14 is referred to as "Y-axis positive direction". Two axes orthogonal to the Y-axis and further orthogonal to each other are referred to as an X-axis and a Z-axis. With respect to the X-axis, the direction from the interface panel 10 and the operation panel 12 toward the center of the projector 100 is referred to as "X-axis positive direction". With respect to the Z-axis, the direction from a surface on which the projector 100 is mounted toward the center of the projector 100 is referred to as "Z-axis positive direction".

Figure 2:
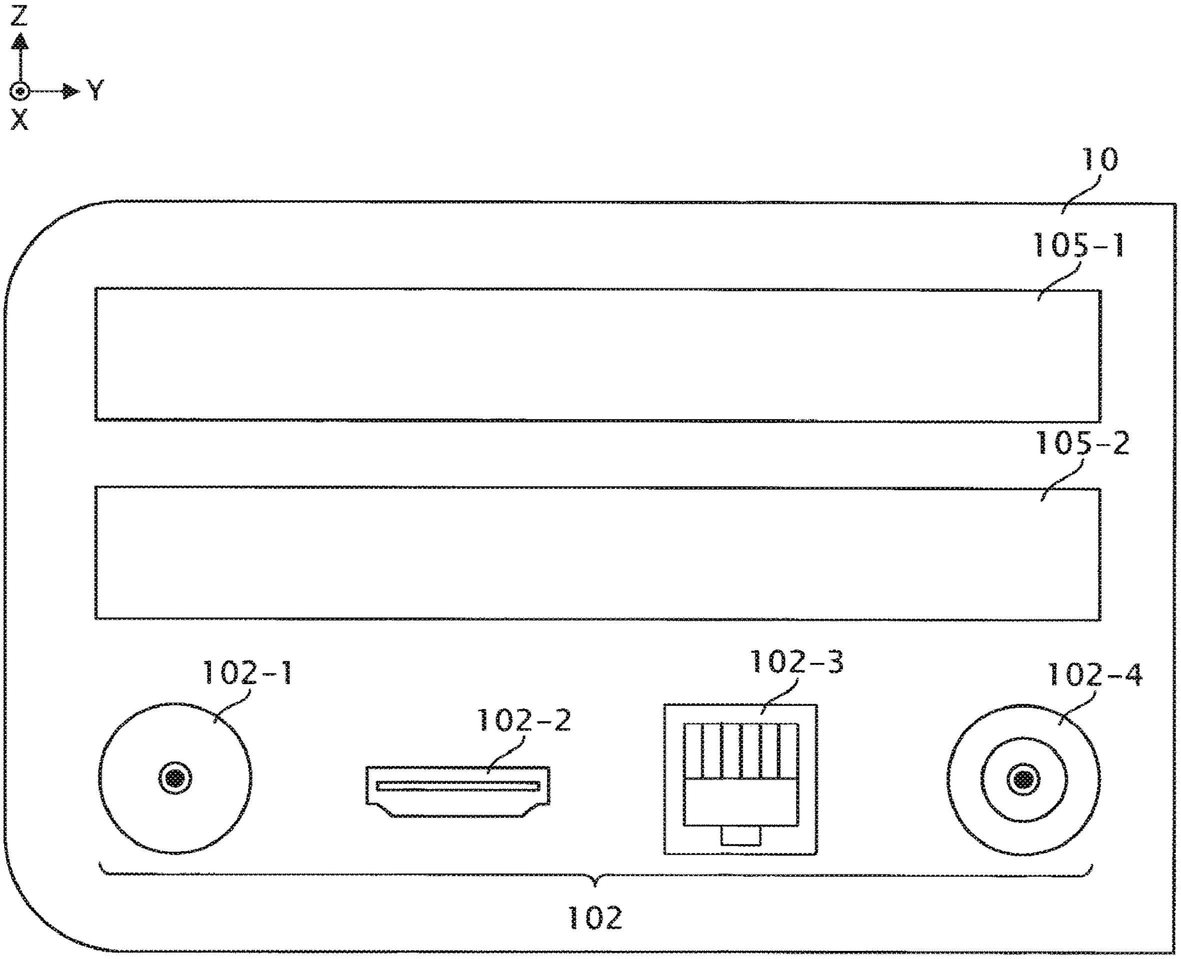
FIG. 2 is a plan view of an interface panel 10.

FIG. 2 is a plan view of the interface panel 10. The interface panel 10 has a plurality of input terminals 102 and two slots 105. The plurality of input terminals 102 include an SDI (Serial Digital Interface) terminal 102-1, an HDMI (Hight Definition Multimedia Interface) (registered trademark) terminal 102-2, a LAN (Local Area Network) terminal 102-3, and a BNC (Bayonet Neill Concelman) terminal 102-4.

In the following explanation, when elements of the same kind are distinguished, reference numerals are used like "SDI terminal 102-1" and "HDMI terminal 102-1", and, when the elements of the same kind are not distinguished, only the common number of the reference numerals may be used like "input terminal 102".

The input terminals 102 are terminals that can receive image signals. The slots 105 enable insertion and ejection of boards for expansion of the functions of the projector 100. The boards include e.g. an interface board (an example of the board) having the input terminal 102. In the embodiment, the interface board is not inserted into the slot 105.

Figure 3:
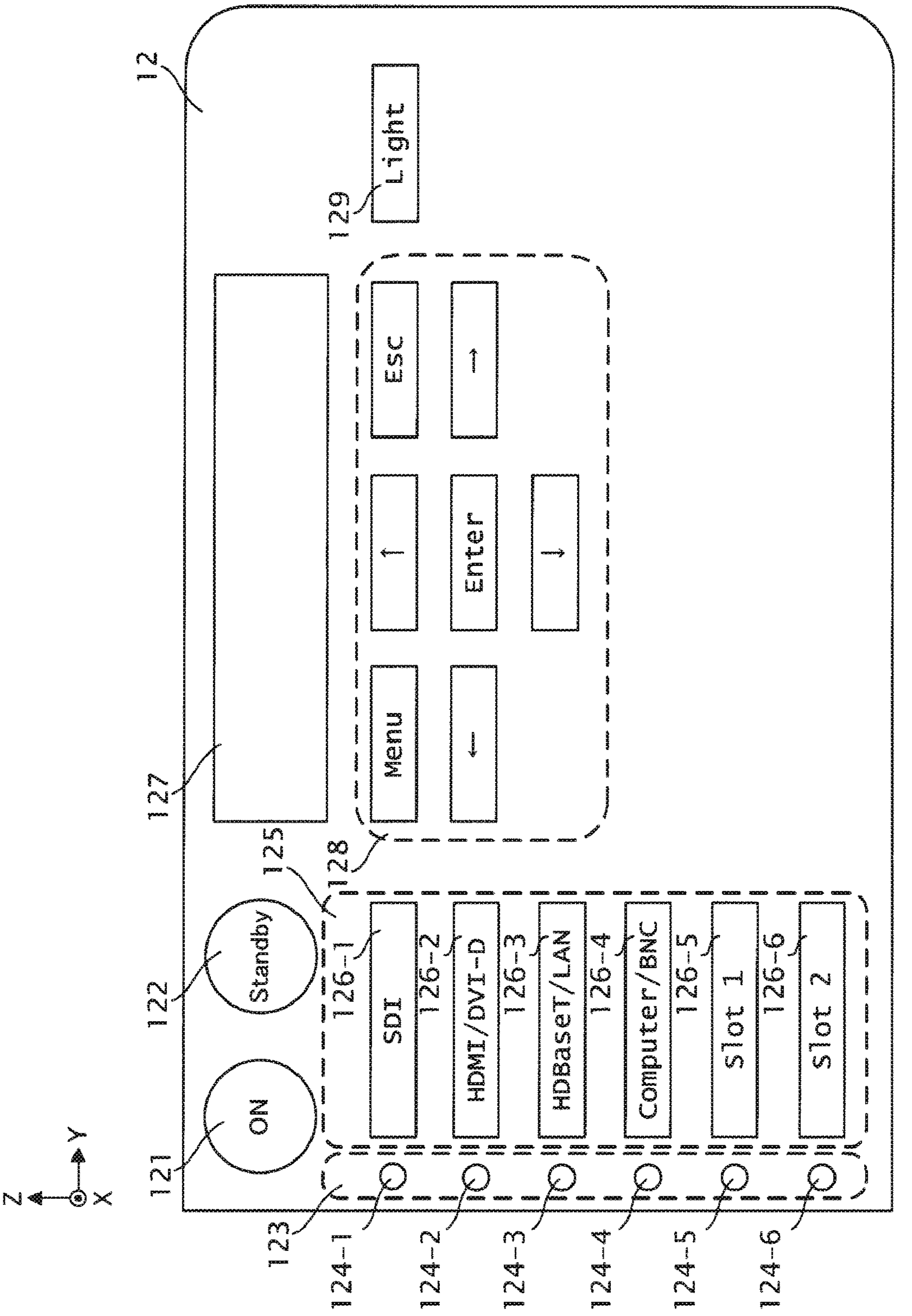
FIG. 3 is a plan view of an operation panel 12.

FIG. 3 is a plan view of the operation panel 12. The operation panel 12 has a power ON button 121, a Standby button 122, a first display part 123, a second display part 125, a status monitor 127 (an example of a fifth display part), an operation button 128, and a Light button 129.

The power ON button 121 is a button for turning on the projector 100. The Standby button 122 is a button for setting the projector 100 to a standby state.

The first display part 123 shows whether or not the input terminal 102 accepts an image signal with respect to each input terminal 102.

The second display part 125 shows the input terminal selected as a selected input terminal among the plurality of input terminals 102. The selected input terminal refers to the input terminal 102 to which the image signal based on which an image is projected on the projection surface SC is input. The selected input terminal is generally one of the input terminals accepting image signals, however, the input terminal not accepting an image signal may be the selected input terminal. For example, a user may turn on the projector 100 and select the input terminal 102 not accepting an image signal as the selected input terminal, and then, connect a cable or the like to the the selected input terminal to receive an image signal.

The first display part 123 is explained more specifically. The first display part 123 has a determination lamp 124 (an example of a third display part and a first light emitting part) corresponding to the input terminal 102 with respect to each input terminal 102. The determination lamp 124 indicates whether or not the input terminal 102 corresponding to the determination lamp 124 accepts an image signal. For example, the determination lamp 124 is lit in blue if the corresponding input terminal 102 accepts an image signal, and extinguished if the corresponding input terminal 102 does not accept an image signal. The blue is an example of a first color.

Specifically, the first display part 123 has the determination lamp 124-1 corresponding to the SDI terminal 102-1, the determination lamp 124-2 corresponding to the HDMI terminal 102-2, the determination lamp 124-3 corresponding to the LAN terminal 102-3, and the determination lamp 124-4 corresponding to the BNC terminal 102-4. Further, the first display part 123 has the determination lamp 124-5 and the determination lamp 124-6. The determination lamp 124-5 corresponds to the input terminal 102 of the interface board inserted into the slot 105-1. The determination lamp 124-6 corresponds to the input terminal 102 of the interface board inserted into the slot 105-2.

The second display part 125 is explained more specifically. The second display part 125 has a selection button 126 (an example of a fourth display part and a second light emitting part) corresponding to the input terminals 102 with respect to each input terminal 102. The selection button 126 indicates whether or not the input terminal 102 corresponding to the selection button 126 is the selected input terminal. For example, the selection button 126 is lit in orange if the corresponding input terminal 102 is the selected input terminal, and extinguished if the corresponding input terminal 102 is not the selected input terminal. The orange is an example of a second color. The selected input terminal is the input terminal 102 corresponding to the selection button 126 pressed down by the user.

Specifically, the second display part 125 has the selection button 126-1 corresponding to the SDI terminal 102-1, the selection button 126-2 corresponding to the HDMI terminal 102-2, the selection button 126-3 corresponding to the LAN terminal 102-3, and the selection button 126-4 corresponding to the BNC terminal 102-4. Further, the second display part 125 has the selection button 126-5 and the selection button 126-6. The selection button 126-5 corresponds to the input terminal 102 of the interface board inserted into the slot 105-1. The selection button 126-6 corresponds to the input terminal 102 of the interface board inserted into the slot 105-2.

As shown in FIG. 3, the selection button 126 is placed adjacent to the determination lamp 124 corresponding to the input terminal 102 corresponding to the selection button 126. In the embodiment, the selection button 126 is placed adjacently in a position in the Y-axis positive direction as seen from the determination lamp 124. As described above, the determination lamps 124 are collectively placed near the selection buttons 126.

The status monitor 127 displays an image showing information on the image signal when one of the plurality of input terminals 102 is receiving the image signal. As the status monitor 127, e.g. an LCD (Liquid Crystal Display) is employed. The operation button 128 is used for displaying a menu window, moving a cursor within the menu window, and determining the button of the menu window.

The Light button 129 lights at least the determination lamps 124 and the selection buttons 126 when the Light button 129 is pressed down. Further, the Light button 129 may light the status monitor 127 and the operation button 128. As periods for lighting the determination lamps 124 and the selection buttons 126, for example, there are the following two periods and any one of the two periods may be employed. A first period is a period in which the Light button 129 is pressed down. A second period is a period until a certain time elapses after the Light button 129 is pressed down. In the following explanation, the case where the second period is employed will be explained.

When the Light button 129 is pressed down, the determination lamps 124 are lit in a predetermined color different from the blue (first color) or orange color (second color). For example, when the Light button 129 is pressed down, the determination lamps 124 are lit in white as an example of the predetermined color. When the Light button 129 is pressed down, the color of the determination lamp 124 that has been already lit in blue is unchanged. Similarly, when the Light button 129 is pressed down, the selection buttons 126 are lit in a predetermined color different from the blue (first color) or orange color (second color). When the Light button 129 is pressed down, the color of the selection button 126 that has been already lit in orange is unchanged. For example, when the Light button 129 is pressed down, the selection buttons 126 are lit in white as an example of the predetermined color.

Figure 4:
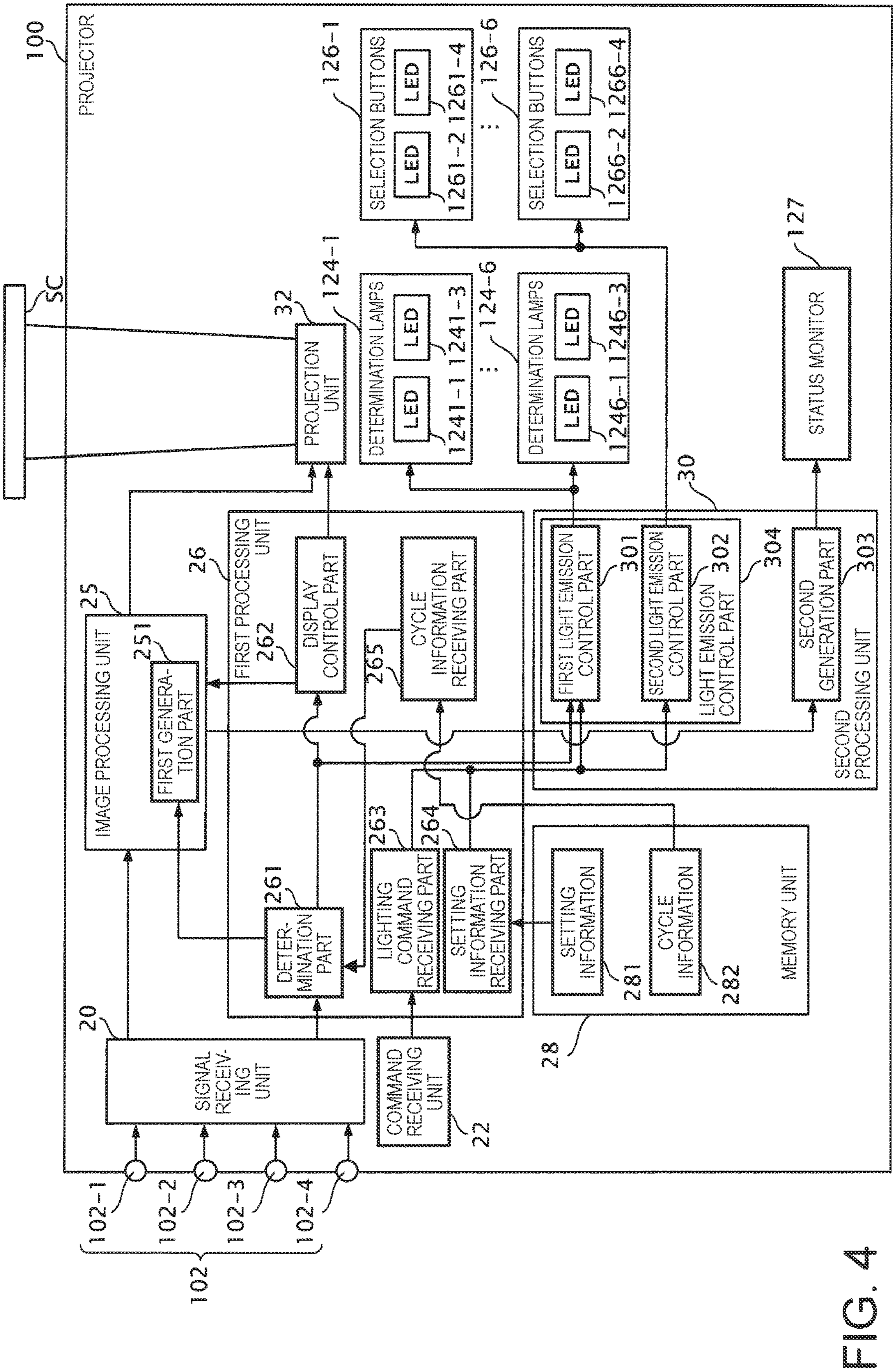
FIG. 4 is a configuration diagram of the projector 100.

FIG. 4 is a configuration diagram of the projector 100. The projector 100 includes a signal receiving unit 20, a command receiving unit 22, an image processing unit 25, a first processing unit 26, a memory unit 28, a second processing unit 30, and a projection unit 32 (an example of an image display unit). The image processing unit 25 includes a first generation part 251.

The signal receiving unit 20 receives the signals received by the input terminals 102. The command receiving unit 22 includes the power ON button 121, the Standby button 122, the selection buttons 126, the operation button 128, and the Light button 129. The command receiving unit 22 receives commands of the user when the above described respective buttons are pressed down.

The image processing unit 25 performs image processing on the image signal input to the selected input terminal of the image signals received by the signal receiving unit 20 according to control by a display control part 262 within the first processing unit 26, which will be described later, and generates image information representing a projection image to be projected on the projection surface SC.

The first generation part 251 generates first OSD (On Screen Display) image information representing a first OSD image based on a determination result of a determination part 261 of the first processing unit 26, which will be described later. The first OSD image shows whether or not the input terminal 102 accepts the image signal with respect to each input terminal 102. For example, the first OSD image is an image showing states of the determination lamps 124 (whether or not the lamps are lit). The image processing unit 25 generates image information showing a superimposition image formed by superimposition of the first OSD image on the projection image.

The first generation part 251 further generates selected image information (e.g. OSD image information) representing a selection image for selection of the input terminal 102 to be indicated as to whether or not to accept the image signals from the plurality of input terminals 102. An example of the selection image is shown using FIG. 5.

Figure 5:
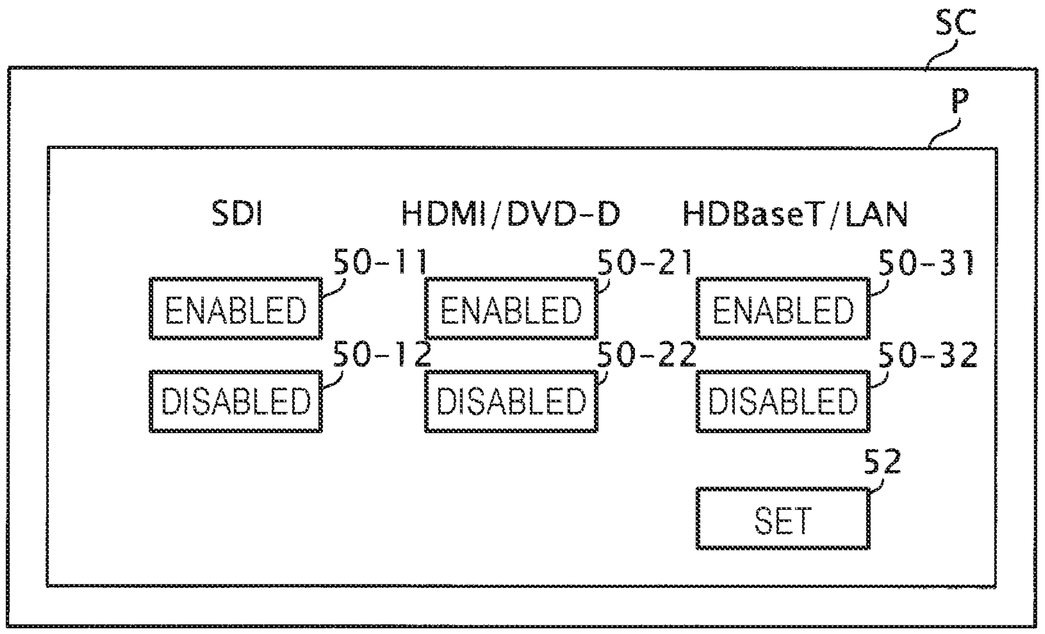
FIG. 5 shows an example of an image P represented by image information generated by a first generation part 251.

FIG. 5 shows an example of a selection image P (hereinafter, simply referred to as "image P"). The image P contains a plurality of selection buttons 50 and a set button 52. The plurality of selection buttons 50 and the set button 52 can be selected using the operation button 128. As the plurality of selection buttons 50, the image P contains selection buttons **50-*x*1 and the selection buttons 50-*x*2 corresponding to the input terminals 102-*x*. In the example of FIG. 5**, x is a natural number from one to three.

One of the selection button **50-*x*1 and the selection button 50-*x*2 is selected. Regarding the input terminals 102 for which the selection button 50-*x*1 is selected, whether or not to accept the image signal is indicated by the corresponding determination lamp 124-*x*. Regarding the input terminal 102 for which the selection button 50-*x*2 is selected, indication as to whether or not to accept the image signal (hereinafter, also referred to as "acceptance state indication") is stopped by the corresponding determination lamp 124-*x*. When the set button 52 is pressed down, the first processing unit 26 generates setting information 281 representing the determination lamps 124 for which the acceptance state indication is stopped based on the current selection status with respect to the selection buttons 50 and stores the information in the memory unit 28**.

Returning to the explanation of FIG. 4, the first processing unit 26 is a computer such as a CPU (Central Processing Unit). The first processing unit 26 may include one or more processors. The first processing unit 26 reads and executes a control program stored in the memory unit 28, and thereby, realizes the determination part 261, a display control part 262, a lighting command receiving part 263, a setting information receiving part 264, and a cycle information receiving part 265. Note that the determination part 261, the display control part 262, the lighting command receiving part 263, the setting information receiving part 264, and the cycle information receiving part 265 may be realized by the one or more processors forming the first processing unit 26. The image processing unit 25 may be realized by one or more processors.

The determination part 261 performs determination processing of determining whether or not the input terminal 102 accepts the image signal with respect to each input terminal 102. For example, there are the following two methods for the determination processing. The first method is a method of determining that the image signal is input to the input terminal 102 when the input terminal 102 receives all of a plurality pieces of information on the image according to the image signal. For example, the plurality of pieces of information contained in the image signal received by the SDI terminal 102-1 include PLL (Phase Locked Loop) lock presence information, resolution information, frequency information, payload IDs (sampling method, color space, link information, etc.) Further, for example, the plurality of pieces of information contained in the image signal received by the HDMI terminal 102-2 include a connection detection signal, clock presence, synchronization signal presence information, resolution information, frequency information, InfoFrame information (color space, pixel repeat information, etc.)

The second information is a method of determining that the input terminal 102 accepts the image signal when the input terminal 102 receives part of the plurality pieces of information on the image according to the image signal. For example, the determination part 261 determines that the SDI terminal 102-1 accepts the image signal when the SDI terminal 102-1 receives the PLL lock presence information. Further, the determination part 261 determines that the HDMI terminal 102-2 accepts the image signal when the HDMI terminal 102-2 receives the connection detection signal or the synchronization signal presence information.

The display control part 262 allows the projection unit 32 to execute processing of projecting and displaying the projection image according to the image signal input to the input terminal selected as the selected input terminal on the projection surface SC. More specifically, the display control part 262 also controls the image processing unit 25 to allow the projection unit 32 to display the projection image on the projection surface SC.

The lighting command receiving part 263 receives lighting commands to light the first display part 123 (see FIG. 3) and the second display part 125 (see FIG. 3). For example, when the user pressed down the Light button 129, the lighting command receiving part 263 receives the press down of the Light button 129 as the above described lighting command.

The setting information receiving part 264 receives the setting information 281 representing the determination lamps 124 for which the acceptance state indication is stopped. As shown in FIG. 4, the setting information 281 is stored in the memory unit 28. For example, the setting information 281 has two forms. The setting information 281 in the first form represents IDs of the determination lamps 124 for which the acceptance state indication is stopped. The setting information 281 in the second form represents a value showing whether or not the acceptance state indication is stopped with respect to each determination lamp 124. As has been explained in FIG. 5, the setting information 281 is generated by operation of the operation button 128 by the user or the like and stored in the memory unit 28. The determination lamps 124 represented by the setting information 281 stop indication as to whether or not the corresponding input terminals 102 accept image signals.

The cycle information receiving part 265 receives cycle information 282 representing a cycle of determination as to whether or not to accept the image signals. As shown in FIG. 4, the cycle information 282 is information stored in the memory unit 28. For example, the cycle information 282 has two forms. The cycle information 282 in the first form represents a cycle with respect to each input terminal 102. The cycle information 282 in the second form represents a uniform cycle for the input terminals 102. The cycle period is e.g. one second or ten seconds. The cycle information 282 is generated by operation of the operation button 128 by the user or the like and stored in the memory unit 28.

When the cycle information receiving part 265 receives the cycle information 282, the determination part 261 determines whether or not each input terminal 102 accepts the image signal in the cycle represented by the cycle information 282.

The memory unit 28 is a computer-readable recording medium. The memory unit 28 is e.g. a flash memory. The memory unit 28 is not limited to the flash memory, but can be appropriately changed. The memory unit 28 stores e.g. various kinds of information including the setting information 281 and the cycle information 282 and programs to be executed by the first processing unit 26 and the second processing unit 30.

The second processing unit 30 is a computer such as a CPU. The second processing unit 30 may include one or more processors. The second processing unit 30 reads and executes a control program stored in the memory unit 28, and thereby, realizes a first light emission control part 301, a second light emission control part 302, and a second generation part 303. The first light emission control part 301 and the second light emission control part 302 are contained in a light emission control part 304. Note that the first light emission control part 301, the second light emission control part 302, and the second generation part 303 may be realized by the one or more processors forming the second processing unit 30. Or, the respective parts contained in the first processing unit 26 and the second processing unit 30 may be realized by the same processor. Or, the projector 100 may have a multicore processor with a plurality of processor cores, and the first processing unit 26 and the second processing unit 30 may be the different processor cores contained in the multicore processor.

The first light emission control part 301 controls the determination lamp 124 to be lit when the input terminals 102 corresponding to the determination lamp 124 accepts the image signal and to be extinguished when the input terminal 102 does not accept the image signal. The first light emission control part 301 uses the determination result of the determination part 261 as to whether the input terminal 102 accepts the image signal. As shown in FIG. 4, the determination lamp 124 has an LED (Light Emitting Diode) **124*x*-1 and an LED 124*x*-3. The x is the value of the end of the reference numeral of the determination lamp 124. For example, the value of the end of the reference numeral of the determination lamp 124-1 is "1", and the determination lamp 124-1 has the LED 1241-1 and the LED 1241-3. The LED 124*x*-1 and the LED 124*x*-3 are light sources that emit lights in different colors from each other. The LED 124*x*-1 is lit in blue and the LED 124*x*-3** is lit in white. The LED lit in white may be produced by a combination of a fluorescent material that fluoresces in yellow and a blue light emitting diode, for example.

For example, when the SDI terminal 102-1 accepts the image signal, the first light emission control part 301 lights the LED 1241-1 to light the determination lamp 124 in blue.

In the explanation of the setting information receiving part 264, the determination lamps 124 represented by the setting information 281 stop the acceptance state indication. To realize the above described explanation, the first light emission control part 301 extinguishes the determination lamp 124 when the input terminal 102 corresponding to the determination lamp 124 accepts the image signal, but the determination lamp 124 is represented by the setting information 281.

The second light emission control part 302 lights the selection button 126 when the input terminal 102 corresponding to the selection button 126 is the selected input terminal and extinguishes the selection button when the input terminal 102 is not the selected input terminal. As shown in FIG. 4, the selection button 126 has an LED 126$x$-2 and an LED 126$x$-4. The x is the value of the end of the reference numeral of the selection button 126. For example, the value of the end of the reference numeral of the determination lamp 126-1 is "1", and the selection button 126-1 has the LED 1261-2 and the LED 1261-4. The LED 126$x$-1 and the LED 126$x$-4 are light sources that emit lights in different colors from each other. The LED 126$x$-1 is lit in orange and the LED 126$x$-3 is lit in white.

For example, when the SDI terminal 102-1 is the selected input terminal, the second light emission control part 302 lights the LED 1261-2 to light the selection button 126 in orange.

When the lighting command receiving part 263 receives the lighting command, the light emission control part 304 lights the determination lamp 124 corresponding to the input terminal 102 not accepting the image signal and the selection button 126 corresponding to the input terminal 102 not the selected input terminal in white different from blue or orange.

For example, when the lighting command is received, the first light emission control part 301 maintains lighting of the LED 124$x$-1 corresponding to the input terminal 102 accepting the image signal and maintains extinction of the LED 124$x$-3. On the other hand, the first light emission control part 301 maintains extinction of the LED 124$x$-1 corresponding to the input terminal 102 not accepting the image signal and lights the LED 124$x$-3. Similarly, when the lighting command is received, the second light emission control part 302 maintains lighting of the LED 126$x$-2 corresponding to the selected input terminal and maintains extinction of the LED 126$x$-4. On the other hand, the second light emission control part 302 maintains extinction of the LED 126$x$-2 corresponding to the input terminal 102 not the selected input terminal and lights the LED 126$x$-4.

For example, it is assumed that the SDI terminal 102-1, the HDMI terminal 102-2, and the LAN terminal 102-3 accept the image signals and the BNC terminal 102-4 does not accept the image signal, and the SDI terminal 102-1 is the selected input terminal.

On the assumption, when the lighting command is received, the first light emission control part 301 maintains lighting of the LED 1241-1, the LED 1242-1, and the LED 1243-1, and maintains extinction of the LED 1241-3, the LED 1242-3, and the LED 1243-3. Thereby, the determination lamp 124-1, the determination lamp 124-2, and the determination lamp 124-3 are lit in blue. Further, the first light emission control part 301 maintains extinction of the LED 1244-1 and lights the LED 1244-3. Thereby, the determination lamp 124-4 is lit in white.

Similarly, when the lighting command is received, the second light emission control part 302 maintains lighting of the LED 1261-2 and maintains extinction of the LED 1261-4. Thereby, the selection button 126-1 is lit in orange. Further, the second light emission control part 302 maintains extinction of the LED 1262-2, the LED 1263-2, and the LED 1264-2, and lights the LED 1262-4, the LED 1263-4, and the LED 1264-4. Thereby, the selection button 126-2, the selection button 126-3, and the selection button 126-4 are lit in white.

Note that, when the lighting command is received, the determination lamp 124-5 and determination lamp 124-6 and the selection button 126-5 and selection button 126-6 may be lit in white or extinguished.

When the input terminal 102 accepts the image signal, the second generation part 303 generates image information representing an image showing information on the image signal (hereinafter, referred to as "first image information"). The information on the image signal is e.g. at least one of the resolution of the image signal and the frequency of the image signal. The image showing information on the image signal is e.g. an image showing numeric values of the resolution of the image signal, the frequency of the image signal, etc. Specifically, the second generation part 303 acquires the information on the image signal from the image processing unit 25. Then, the second generation part 303 generates the first image information from the acquired information. The second generation part 303 outputs the generated first image information to the status monitor 127. The status monitor 127 displays the image represented by the first image information.

The projection unit 32 projects the projection image represented by the image information generated by the image processing unit 25 on the projection surface SC according to the control of the first processing unit 26. The configuration of the projection unit 32 is explained using FIG. 6.

Figure 6:
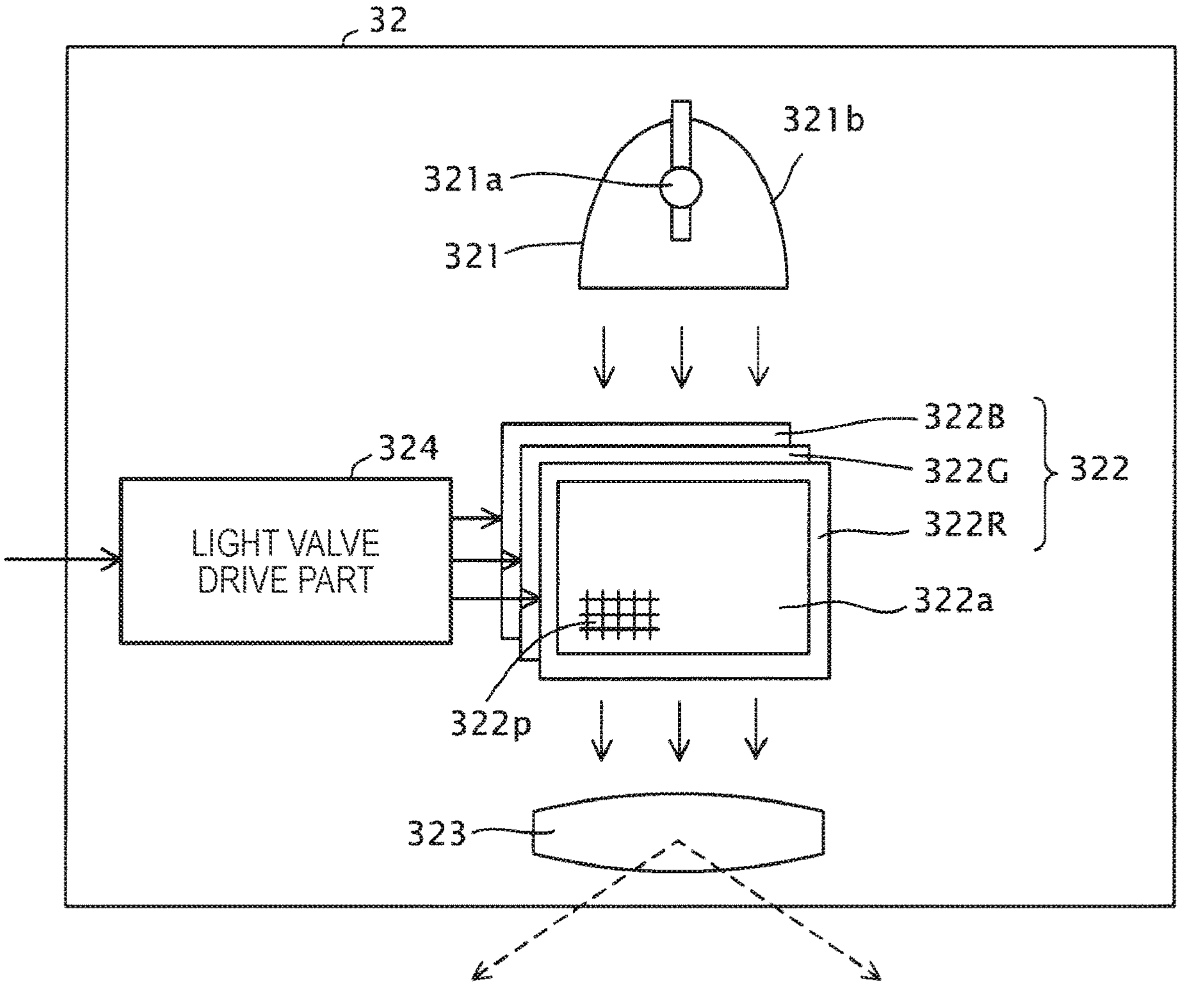
FIG. 6 shows an example of a projection unit 32.

FIG. 6 shows an example of the projection unit 32. The projection unit 32 includes a light source 321, three liquid crystal light valves 322 (322R, 322G, 322B) as examples of light modulation devices, the projection lens 323 as an example of a projection system, a light valve drive part 324, etc. The projection unit 32 modulates the light output from the light source 321 with the liquid crystal light valves 322 and forms a projection image (image light), and enlarges and projects the projection image from the projection lens 323. The projection image is displayed on the projection surface SC.

The light source 321 includes a light source part 321$a$ formed by a xenon lamp, ultrahigh-pressure mercury lamp, LED, laser light source, or the like, and a reflector 321$b$ that reduces variations of the directions of the lights radiated from the light source part 321$a$. Regarding the lights radiated from the light source part 321$a$, variations of the brightness distribution are reduced by an optical integration system (not shown), and then, lights are separated into color light components of red (R), green (G), blue (B) as three primary colors of light by a color separation system (not shown). The color light components of R, G, B enter the liquid crystal light valves 322R, 322G, 322B, respectively.

The liquid crystal light valve 322 is a liquid crystal panel with liquid crystal sealed between a pair of transparent substrates. In the liquid crystal light valve 322, a rectangular pixel area 322$a$ including a plurality of pixels 322$p$ arranged in a matrix form is formed. In the liquid crystal light valve 322, a drive voltage can be applied to the liquid crystal with respect to each pixel 322$p$. When the light valve drive part 324 applies the drive voltage according to the image information input from the image processing unit 25 to each pixel 322$p$, each pixel 322$p$ is set at light transmittance according to the image information. Accordingly, the light output from the light source 321 is transmitted through the pixel area 322*a* and modulated, and a projection image according to the image information are formed with respect to each color light.

Figure 7:
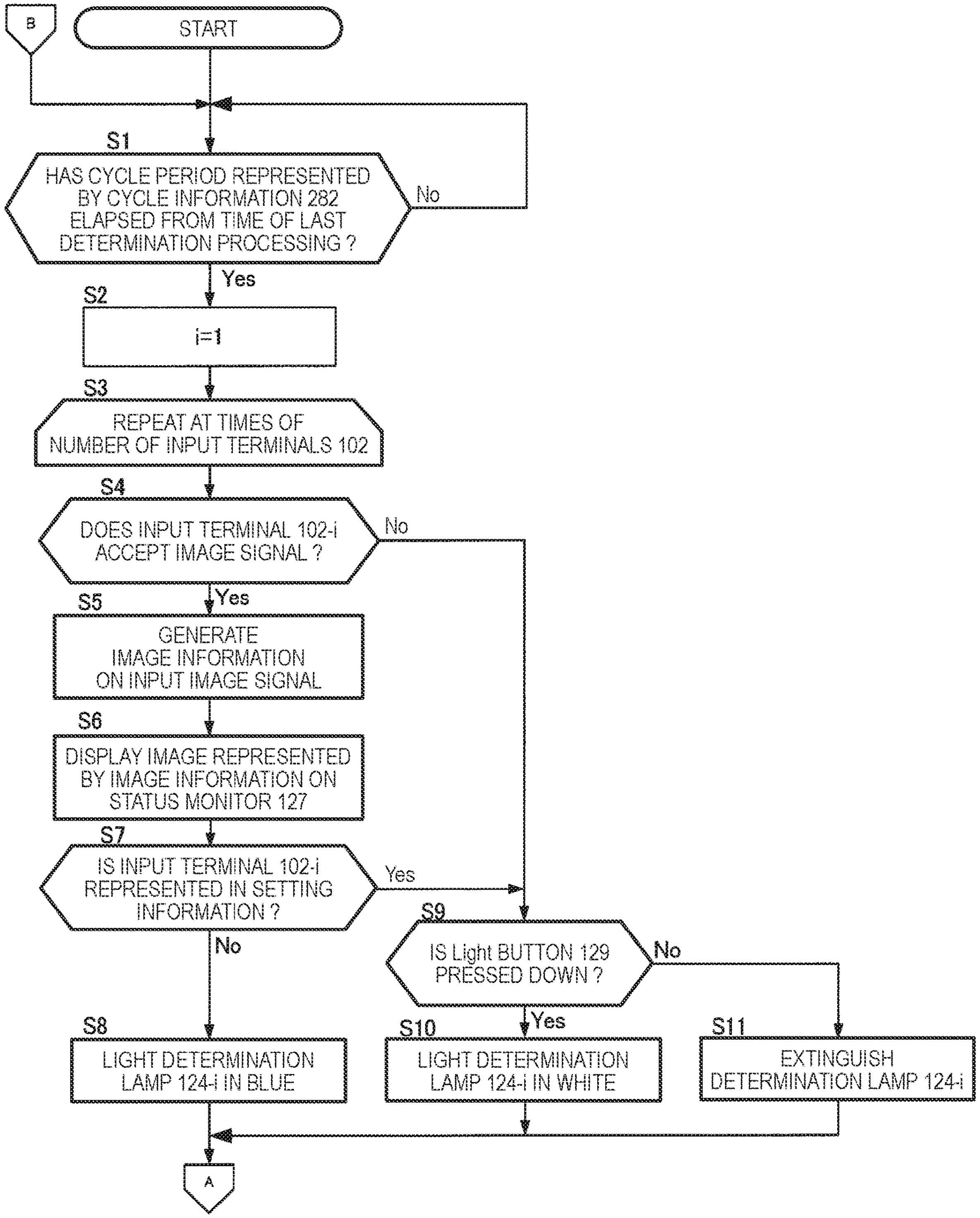
FIG. 7 is a flowchart for explanation of an operation of the projector 100 (Part 1).
Figure 8:
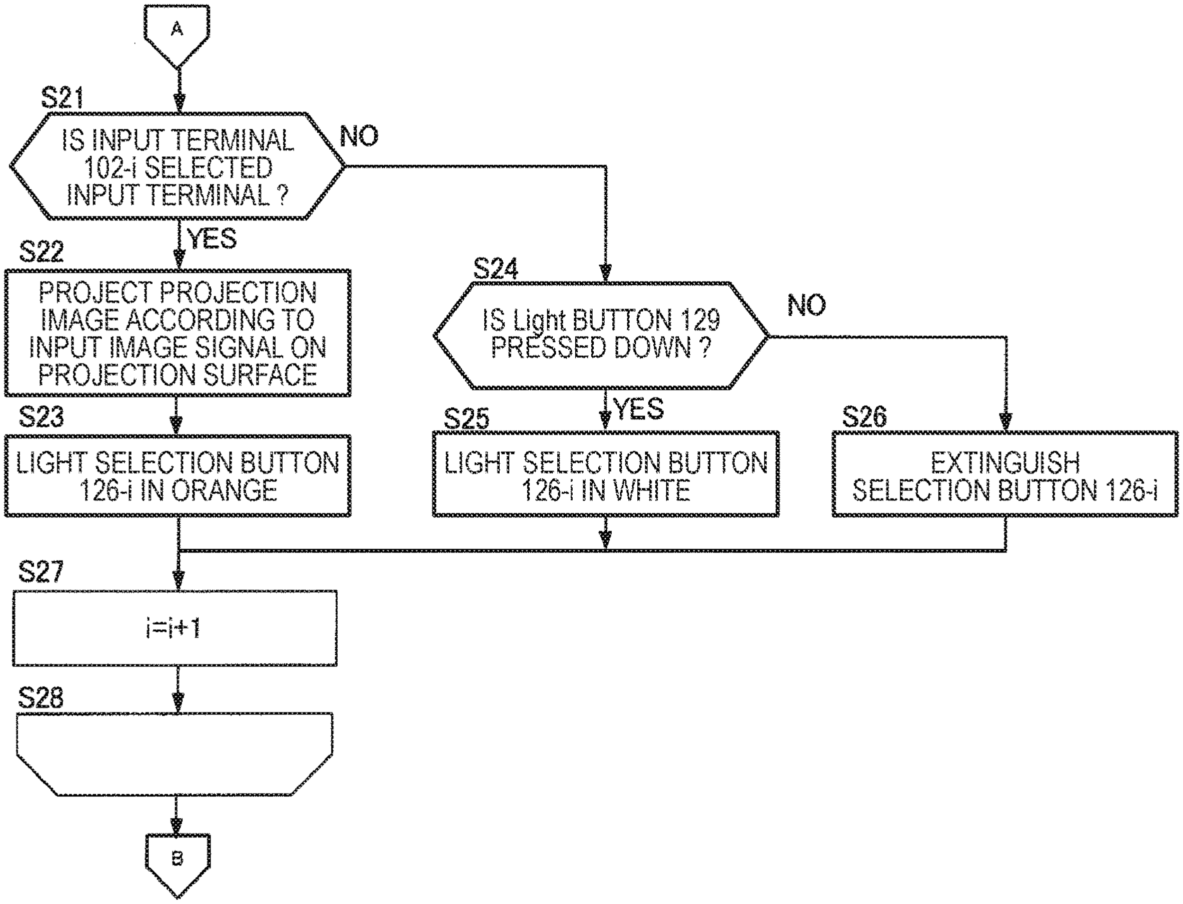
FIG. 8 is a flowchart for explanation of the operation of the projector 100 (Part 2).

FIGS. 7 and 8 are flowcharts for explanation of an operation of the projector 100.

The determination part 261 determines that a cycle period represented by the cycle information 282 has elapsed from the time of the last determination processing (step S1). If the cycle period represented by the cycle information 282 has not elapsed (step S1: No), the determination part 261 executes the processing at step S1 again. If the cycle period represented by the cycle information 282 has elapsed (step S1: Yes), a variable i=1 is set (step S2), and the projector 100 repeats processing from step S3 to step S11 and from step S21 and step S28 at the times of the number of input terminals 102.

The determination part 261 determines whether of not the input terminal 102-*i* accepts the image signal (step S4). The i is a natural number from one to six. If a determination that the input terminal 102-*i* accepts the image signal is made (step S4: Yes), the second generation part 303 generates the image information (first image information) on the input image signal (step S5). Then, the second generation part 303 allows the status monitor 127 to display the image represented by the generated image information (step S6).

Then, the first light emission control part 301 determines whether or not the input terminal 102-*i* is represented in the setting information 281 (step S7). Note that the determination lamp 124-*i* corresponding to the input terminal 102-*i* represented in the setting information 281 stops indication as to whether the input terminal 102-*i* accepts the image signal. If the input terminal 102-*i* is not represented in the setting information 281 (step S7: No), the first light emission control part 301 lights the determination lamp 124-*i* in blue (step S8).

If a determination that the input terminal 102-*i* does not accept the image signal is made (step S4: No) or if the input terminal 102-*i* is represented in the setting information 281 (step S7: Yes), the first light emission control part 301 determines whether or not the Light button 129 is pressed down (step S9). If the Light button 129 is pressed down (step S9: Yes), the first light emission control part 301 lights the determination lamp 124-*i* in white (step S10).

On the other hand, if the Light button 129 is not pressed down (step S9: No), the first light emission control part 301 extinguishes the determination lamp 124-*i* (step S11).

After execution of the processing at step S8, the processing at step S10, or the processing at step S11, the display control part 262 and the second light emission control part 302 determine whether or not the input terminal 102-*i* is the selected input terminal (step S21). As a specific determination method, for example, when the selection button 126 is pressed down, the first processing unit 26 stores information representing the pressed down selection button 126 in the memory unit 28. The display control part 262 and the second light emission control part 302 determine whether or not the input terminal 102-*i* is the selected input terminal with reference to the above described information stored in the memory unit 28 (the information representing the pressed down selection button 126).

If the input terminal 102-*i* is the selected input terminal (step S21: Yes), the display control part 262 controls the image processing unit 25 and the projection unit 32 to project the projection image according to the input image signal on the projection surface SC (step S22). The second light emission control part 302 lights the selection button 126-*i* in orange (step S23).

On the other hand, if the input terminal 102-*i* is not the selected input terminal (step S21: No), the second light emission control part 302 determines whether or not the Light button 129 is pressed down (step S24). If the Light button 129 is pressed down (step S24: Yes), the second light emission control part 302 lights the selection button 126-*i* in white (step S25). On the other hand, if the Light button 129 is not pressed down (step S24: No), the second light emission control part 302 extinguishes the selection button 126-*i* (step S26).

After execution of the processing at step S23, the processing at step S25, or the processing at step S26, the variable i=i+1 is set (step S27), and the processing from step S3 to step S11 and from step S21 and step S28 is repeated.

After the processing from step S3 to step S11 and from step S21 and step S28 is repeated at the times of the number of input terminals 102, and then, the determination part 261 executes the processing at step S1 again.

In the projector 100 and the control method for the projector 100 according to the embodiment, the first display part 123 shows whether or not each input terminal 102 accepts the image signal and the second display part 125 shows the selected input terminal from the plurality of input terminals 102. Thereby, the first display part 123 shows which of the plurality of input terminals 102 accepts the image signal and the second display part 125 shows the selected input terminal. Accordingly, the projection image displayed on the projection surface SC can let the user know which input terminal 102 of the plurality of input terminals 102 accepting the image signals has received the image signal on which the image being displayed is based.

Further, which of the plurality of input terminals 102 accepts the image signal is shown, and thereby, for example, when the image received by the selected input terminal has a defect, the user considers switching of the selected input terminal to the other input terminal 102. Before switching of the selected input terminal, the user can view the first display part 123 to know which of the plurality of input terminals 102 accepts the image signal.

Furthermore, the user may separately visually recognize whether or not the terminal is the selected input terminal and whether or not the terminal accepts the image signal. Therefore, when the plurality of input terminals 102 accept the individual image signals independently at the same time, the user may determine whether or not the terminals are the selected input terminal and whether or not the terminals accept the image signals without hesitation.

In the embodiment, the first display part 123 has the determination lamp 124 indicating whether or not the input terminal accepts the image signal with respect to each input terminal 102, and the second display part 125 has the selection button 126 whether or not the input terminal is the selected input terminal with respect to each input terminal 102. Thereby, the user can view the determination lamps 124 and the selection buttons 126 to know whether or not the terminals accept the image signals and whether or not the terminals are the selected input terminal.

In the embodiment, the first light emission control part 301 lights the determination lamp 124 when the input terminal 102 corresponding to the determination lamp 124 accepts the image signal and extinguishes the lamp when the above described input terminal 102 does not accept the image signals. In the case where a positive mode or negative mode is shown according to lighting or extinction, a general method of showing information is showing a positive mode by lighting. As to whether or not to accept the image signal, acceptance of the image signal is the positive mode. According to the general method of showing information, the determination lamp 124 corresponding to the input terminal 102 accepting the image signal is lit, and thereby, the user may easily know which of the plurality of input terminals 102 is the input terminal accepting the image signal.

In the embodiment, the second light emission control part 302 lights the selection button 126 when the input terminal 102 corresponding to the selection button 126 is the selected input terminal and extinguishes the selection button when the above described input terminal 102 is not the selected input terminal. Here, as to whether the input terminal 102 is the selected input terminal, the positive mode is that the input terminal 102 is the selected input terminal. According to the general method of showing information, the selection button 126 corresponding to the selected input terminal is lit and the user may easily know the selected input terminal.

In the embodiment, when the Light button 129 is pressed down, at least the determination lamp 124 corresponding to the input terminal 102 not accepting the image signal and the selection button 126 corresponding to the input terminal 102 not the selected input terminal are lit in white. Incidentally, to make the image projected from the projector 100 clearer, the projector 100 may be operated in a dark place. In this case, it is harder to visually recognize the determination lamps 124 and the selection buttons 126 in the dark place. Accordingly, the determination lamps 124 and the selection buttons 126 are lit in white and it is easier for the user to visually recognize the determination lamps 124 and the selection buttons 126.

Further, the lamps are lit in white, and thereby, the user may know that the input terminal 102 corresponding to the determination lamp 124 lit in white does not accept the image signal and the input terminal 102 corresponding to the selection button 126 lit in white is not the selected input terminal.

In the embodiment, when the Light button 129 is pressed down, lighting of the LED 124*x*-1 corresponding to the input terminal 102-*x* accepting the image signal is maintained and extinction of the LED 124*x*-3 is maintained, and extinction of the LED 124*y*-1 corresponding to the input terminal 102-*y* not accepting the image signal is maintained and the LED 124*y*-3 is lit. Similarly, when the Light button 129 is pressed down, lighting of the LED 126*w*-2 corresponding to the selected input signal is maintained and extinction of the LED 126*w*-4 is maintained, and extinction of the LED 126*z*-2 corresponding to the input terminal 102-*z* not the selected input terminal is maintained and the LED 126*z*-4 is lit. When the projector 100 is located in the dark place, the determination lamp 124-*x* lit by the LED 124*x*-1 may be visually recognized even when the LED 124*x*-3 is extinguished, and thus, the LED 124*x*-3 may be extinguished for reduction of power consumption. Similarly, the determination lamp 126-*w* lit by the LED 126*w*-2 may be visually recognized even when the LED 126*w*-4 is extinguished, and thus, the LED 126*x*-4 may be extinguished for reduction of power consumption.

Furthermore, for the determination lamps 124-*x* corresponding to the input terminals 102 accepting the image signal, the LED 124*x*-1 is lit and, if the LED 124*x*-3 is also lit, the colors of the light of the LED 124*x*-1 and the light of the LED 124*x*-3 are mixed. The user viewing the lights with mixed colors may misunderstand that the lights have a different meaning from acceptance of the image signal. Therefore, the LED 124*x*-3 is extinguished, and thereby, the above described misunderstanding may be prevented. Similarly, for the selection button 126 corresponding to the selected input terminal, the LED 126*w*-2 is lit and, if the LED 126*w*-4 is also lit, the colors of the light of the LED 126*w*-2 and the light of the LED 126*w*-4 are mixed. The user viewing the lights with mixed colors may misunderstand that the lights have a different meaning from being the selected input terminal. Therefore, the LED 126*w*-4 is extinguished, and thereby, the above described misunderstanding may be prevented.

In the embodiment, the selection button 126 is placed adjacent to the determination lamp 124. The selection button 126 and the determination lamp 124 are adjacent to each other, and thereby, the user may know whether or not the input terminal 102 accepts the image signal and whether or not the terminal is the selected input terminal at a glance.

In the embodiment, the setting information 281 representing the determination lamp 124 that stops indication as to whether or not the terminal accepts the image signal is received, and the determination lamp 124 represented by the setting information 281 stops indication as to whether or not there is input to the corresponding input terminal 102. Thereby, only the determination lamp 124 desired by the user may be lit according to the use environment of the projector 100. For example, in the case where an image signal is constantly input to a certain input terminal 102, lighting of the determination lamp 124 may be unnecessary. In this case, the input terminal 102 is registered in the setting information 281, and thereby, lighting of the determination lamp 124 corresponding to the input terminal 102 can be avoided. The lighting of the determination lamp 124 is avoided, and thereby, presentation of unnecessary information to the user may be prevented and the power consumption can be suppressed.

In the embodiment, whether or not each input terminal 102 accepts the image signal is determined according to the cycle represented by the cycle information 282. Thereby, whether or not the input terminal 102 accepts the image signal is determined according to the cycle designated by the user, and thereby, determination can be made at an appropriate frequency according to the states of the image signal and the display apparatus.

In the embodiment, when the input terminal 102 receives part of the plurality of pieces of information on the image according to the image signal, the determination that the input terminal 102 accepts the image signal is made. In this manner, the determination is made by part of information without determination as to whether or not all of the plurality of pieces of information are contained, and thereby, the determination may be made in a shorter time and load on the determination can be suppressed.

In the embodiment, the image showing whether or not the image signal is accepted is projected on the projection surface SC. Even when it is hard to visually recognize the first display part 123, the user may view the image projected on the projection surface SC and determine whether or not the input terminal 102 accepts the image signal. As the case where it is hard for the user to visually recognize the first display part 123, for example, during a presentation or an event, the user is located near the projection surface SC apart from the projector 100 and operates the projector 100 using a remote.

In the embodiment, the image showing the information on the image signal is displayed on the status monitor 127. Thereby, the user may know information on the image including resolution, frequency, etc. that can not be known from the first display part 123.

MODIFIED EXAMPLES

The above described respective embodiments may be variedly modified. Specific modified embodiments will be exemplified as below. Two or more embodiments arbitrarily selected from the following exemplifications may be appropriately combined within a range mutually consistent. Note that, in the modified examples to be exemplified as below, the detailed explanation of the respective elements having equal actions and functions to those of the above described embodiments will be omitted using the signs referred to in the above described explanation.

First Modified Example

In the embodiment, no interface board is inserted into the slot 105, however, in the first modified example, an example of the case where an interface board is inserted into the slot 105 is shown.

Figure 9:
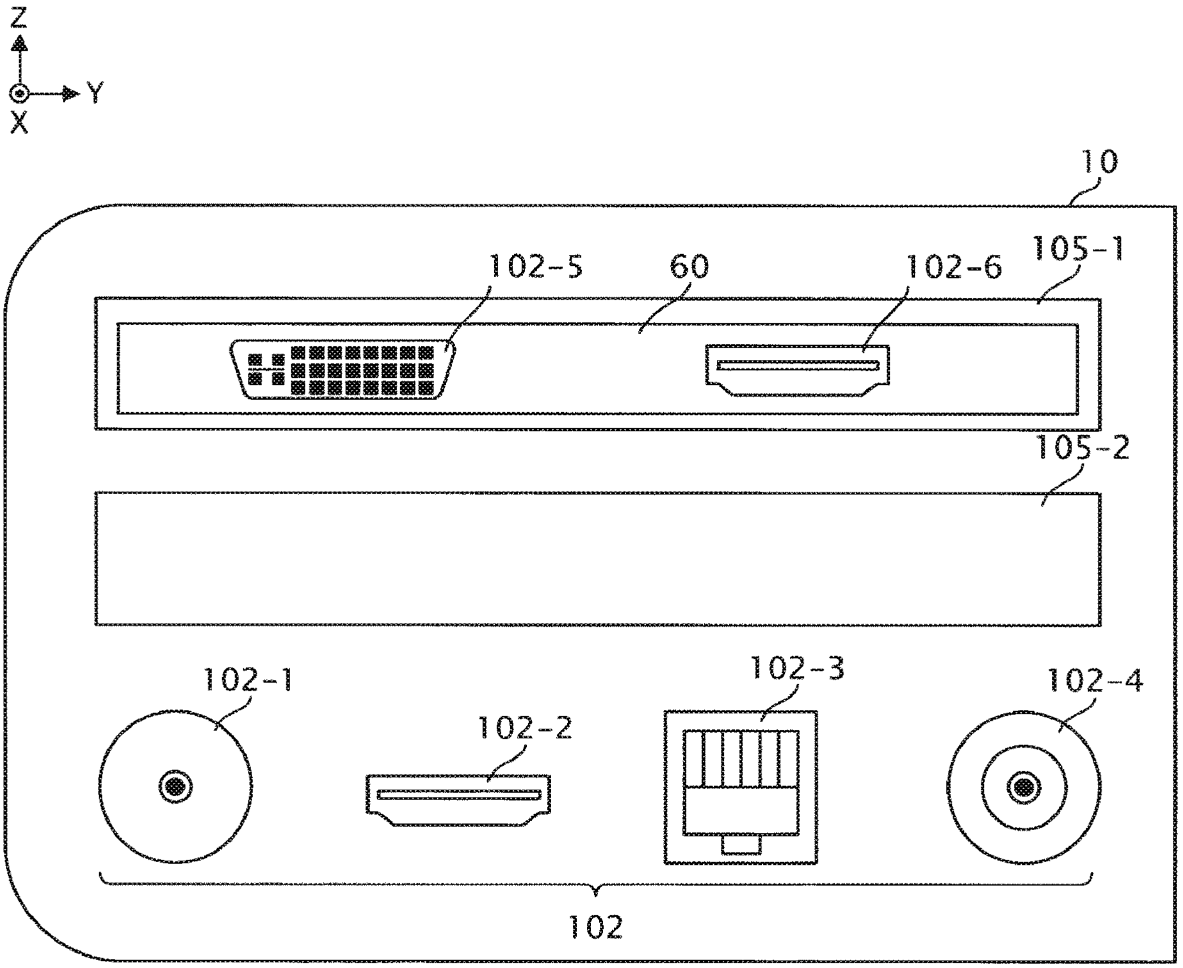
FIG. 9 is a plan view of the interface panel 10 in a first modified example.

FIG. 9 is a plan view of the interface panel 10 in the first modified example. An interface board 60 is inserted into the slot 105-1 of the interface panel 10 in the first modified example. The interface board 60 has a DVI (Digital Visual Interface) terminal 102-5 and an HDMI terminal 102-6. The plurality of input terminals 102 include the DVI terminal 102-5 and the HDMI terminal 102-6.

Figure 10:
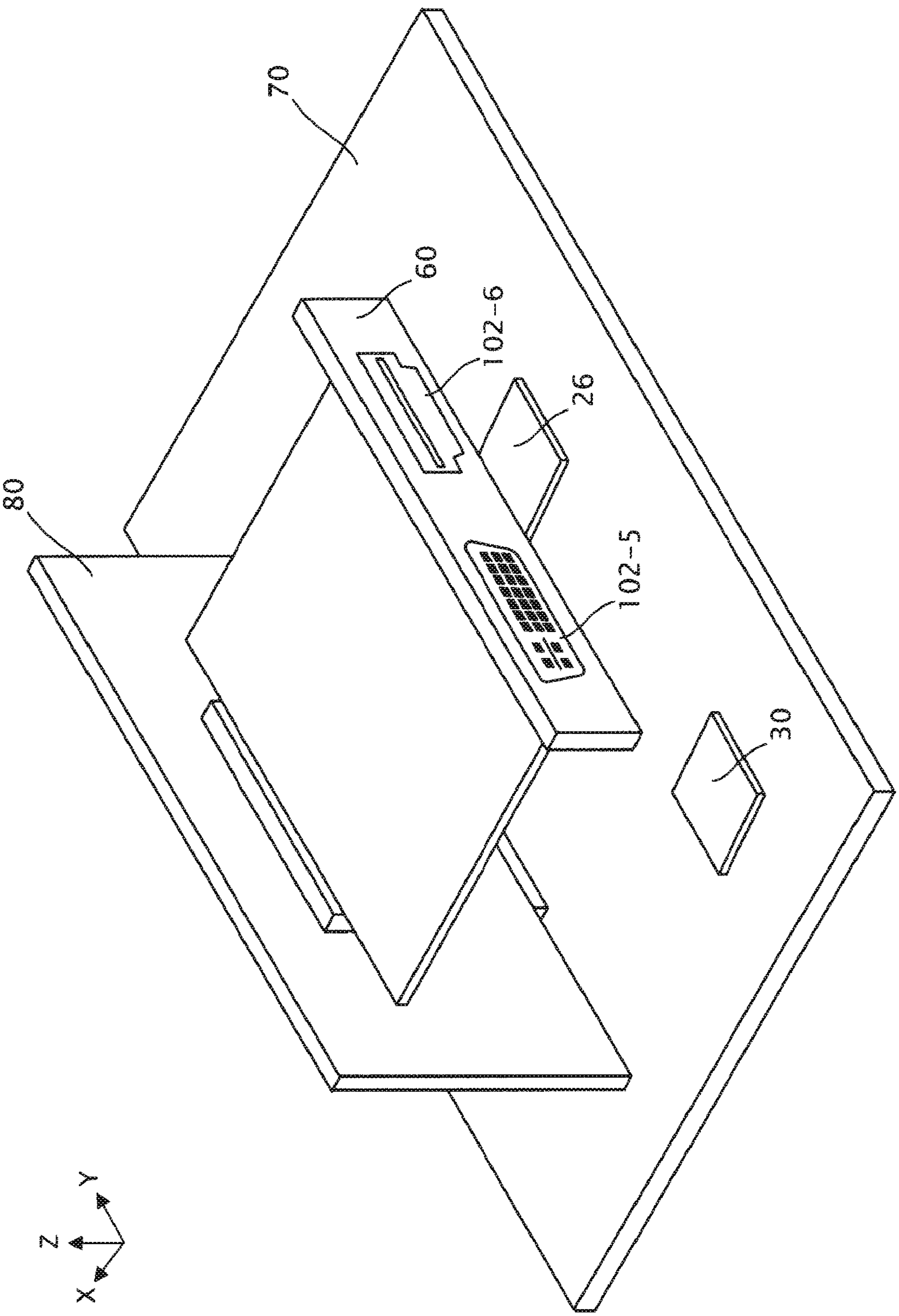
FIG. 10 is a perspective view of a circuit board 70 including an interface board 60.

FIG. 10 is a perspective view of a circuit board 70 including the interface board 60. In FIG. 10, the circuit board 70, a circuit board 80, and the interface board 60 are drawn. On the circuit board 70, the first processing unit 26, the second processing unit 30, etc. are mounted. The circuit board 70 and the interface board 60 are electrically connected via the circuit board 80.

In a projector 100 and a control method for the projector 100 in the first modified example, the first display part 123 further shows whether or not the input terminals 102 of the interface board inserted into the 105 accept image signals. In the above described manner, the user may easily know whether or not the input terminals including the input terminals 102 of the interface board 60 accept image signals and are the selected input terminal. Even in the case having the slots 105 for expansion of the functions like the projector 100, the user may easily know whether or not the input terminals accept image signals regarding any input terminals 102 of the interface board regardless of the type of the interface board.

In the first modified example, the method of showing whether or not the input terminals 102 of the interface board 60 accept image signals by the first display part 123 is explained. While the interface board 60 has the two input terminals 102, the determination lamp 124 corresponding to the slot 105-1 is only the determination lamp 124-5 and the selection button 126 is only the selection button 126-5. Accordingly, the memory unit 28 stores interface board setting information for setting which of the input terminals 102 corresponds to the determination lamp 124-5 and the selection button 126-5 of the two input terminals 102 of the interface board 60. For example, the interface board setting information is generated by operation of the operation button 128 by the user or the like and stored in the memory unit 28. The determination lamp 124-5 corresponding to the slot 105-1 indicates whether or not the input terminal 102 represented by the interface board setting information accepts the image signal. Similarly, the selection button 126-5 corresponding to the slot 105-1 indicates whether or not the input terminal 102 represented by the interface board setting information is the selected input terminal.

Second Modified Example

In the above described respective embodiments, in the projector 100, to the input terminals 102, the corresponding determination lamps 124 and selection buttons 126 are preset, however, may be freely changed by operation by the user. For example, when the projector 100 has a plurality of HDMI terminals, the memory unit 28 stores setting information for setting the HDMI terminal corresponding to one determination lamp 124-*x* and one selection button 126-*x* of the plurality of HDMI terminals. For example, the setting information is generated by operation of the operation button 128 by the user or the like and stored in the memory unit 28. The determination lamp 124-*x* indicates whether or not the HDMI terminal represented by the setting information accepts the image signal. Similarly, the selection button 126-*x* indicates whether or not the HDMI terminal represented by the setting information is the selected input terminal. In this manner, whether or not the input terminal 102 desired by the user accepts the image signal and whether or not the terminal is the selected input terminal are indicated, and thereby, usability of the projector 100 may be improved.

Third Modified Example

In the above described respective embodiments, the first display part 123 shows whether or not the input terminals accept the image signals by lighting and extinction, however, is not limited to that. For example, in the case where the first display part 123 is an LCD, the LCD as the first display part 123 may display an image showing a character string indicating whether or not the input terminal 102 accepts the image signal with respect to each input terminal 102. Similarly, the second display part 125 shows the selected input terminal by lighting and extinction, however, for example, the second display part 125 may be an LCD and the LCD as the second display part 125 may display an image showing a character string indicating the input terminal 102 as the selected input terminal.

Fourth Modified Example

In the above described respective embodiments, the determination lamp 124 indicates that the input terminal accepts the image signal by lighting and indicates that the input terminal does not accept the image signal by extinction, however, is not limited to that. For example, the determination lamp 124 may indicate that the input terminal does not accept the image signal by lighting and indicate that the input terminal accepts the image signal by extinction.

Fifth Modified Example

In the above described respective embodiments, when lighting command receiving part 263 receives the lighting command, the light emission control part 304 may light the determination lamp 124 corresponding to the input terminal 102 not accepting the image signal and the selection button 126 corresponding to the input terminal 102 not the selected input terminal in white different from blue or orange. For example, even when the lighting command is received, if a certain determination lamp 124-*x* is lit in blue, the light emission control part 304 may maintain the extinction of the selection button 126-*x*. The extinction may be maintained because the user may specify the position of the selection button 126-*x* without lighting the selection button 126-*x*. More specifically, the position of the selection button 126-*x* on the YZ-plane is indicated by the position in the Y-directions of the selection button 126 lit in orange and the position in the Z-directions of the determination lamp 124-*x* lit in blue, and thus, the position of the selection button 126-*x* may be specified without lighting of the selection button 126-*x*.

Sixth Modified Example

In the above described respective embodiments, the operation panel 12 may have an extinction button. The extinction button is for extinguishing the determination lamp 124 corresponding to the input terminal 102 accepting the image signal and the selection button 126 corresponding to the selected input terminal when the extinction button is pressed down.

In the sixth modified example, the first processing unit 26 reads and executes the control program stored in the memory unit 28, and thereby, has an extinction command receiving part in addition to the respective parts shown in FIG. 4. The extinction command receiving part receives an extinction command for extinguishing the determination lamps 124 and the selection button 126. For example, when the user presses down the extinction button, the extinction command receiving part receives the pressing down of the extinction button as the above described extinction command.

When the extinction command receiving part receives the extinction command, the first light emission control part 301 extinguishes the determination lamp 124 corresponding to the input terminal 102 accepting the image signal. Similarly, when the extinction command receiving part receives the extinction command, the second light emission control part 302 extinguishes the selection button 126 corresponding to the selected input terminal. Thereby, when desiring to darken the location in which the projector 100 is installed, the user presses down the extinction button, and thereby, may extinguish the determination lamp 124 corresponding to the input terminal 102 accepting the image signal and the selection button 126 corresponding to the selected input terminal. Thus, the location in which the projector 100 is installed can be made darker.

Seventh Modified Example

In the above described respective embodiments, the determination lamps 124 and the selection buttons 126 have the LEDs as light sources, however, may have xenon lamps or the like, not limited to the LEDs.

Eighth Modified Example

In the above described respective embodiments, the first color is blue and the second color is orange, however, not limited to those. The first color and the second color may be the same color.

Ninth Modified Example

In the above described respective embodiments, the predetermined color is white, however, not limited to white. Further, the predetermined color in the determination lamp 124 may be any color different from the first color, e.g. the second color. Similarly, the predetermined color in the selection button 126 may be any color different from the second color, e.g. the first color.

Tenth Modified Example

In the above described respective embodiments, the predetermined color is white and one LED is lit in white, however, white light may be generated by lighting of a plurality of LEDs. For example, the determination lamp 124 may have three LEDs of a blue LED, a green LED, and a red LED, and all of the three LEDs may be lit to light the determination lamp 124 in white. When the determination lamp 124 has the above described three LEDs, for lighting the determination lamp 124 in blue, the blue LED of the above described three LEDs may be lit. The same applies to the selection button 126.

Eleventh Modified Example

In the above described respective embodiments, the selection button 126 is placed adjacently in the position in the Y-axis positive direction as seen from the determination lamp 124, however, not limited to that. For example, the selection button 126 may be placed adjacently in a position in the Y-axis negative direction, placed adjacently in a position in the Z-axis positive direction, or placed adjacently in a position in the Z-axis negative direction as seen from the determination lamp 124.

Twelfth Modified Example

In the above described respective embodiments, whether or not each input terminal 102 accepts the image signal is determined in the cycle represented by the cycle information 282, however, not limited to that. For example, the determination part 261 may determine whether or not the input terminal accepts the image signal when an interrupt signal indicating that the signal of the input terminal 102 changes is received. For example, the processor forming the first processing unit 26 executes the processing of the determination part 261 as ISR (Interrupt Service Routine) when the above described interrupt signal is received.

Thirteenth Modified Example

In the above described respective embodiments, as described above, the determination part 261 can execute the above described first method or second method, however, whether the first method or second method is executed may be selected by the user by operation of the operation button 128.

Fourteenth Modified Example

In the above described respective embodiments, in the case where there are many contents to be displayed and there is not enough room in the image P shown in FIG. 5, the image P has a “next” button and, when the “next” button is operated, an image showing the contents to be displayed beyond the image P may be displayed instead of the image P.

Fifteenth Modified Example

In the projection unit 32 in the above described respective embodiments, the liquid crystal light valve is used as the light modulation device, however, the light modulation device is not limited to the liquid crystal light valve, but can be appropriately changed. For example, the light modulation device may have a configuration using three reflective liquid crystal panels. Or, the light modulation device may have a configuration of a system using one liquid crystal panel, a system using three digital mirror devices (DMDs), a system using a single digital mirror device, or the like. When only one liquid crystal panel or DMD is used as the light modulation device, members corresponding to the color separation system and the color combining system are unnecessary. Or, another configuration that can modulate lights emitted by light sources than the liquid crystal panel or DMD may be employed as the light modulation device.

Sixteenth Modified Example

All or part of the elements realized by the first processing unit 26 and the second processing unit 30 executing the programs may be realized by hardware using an electronic circuit such as e.g. an FPGA (Field Programmable Gate Array) or ASIC (Application Specific IC) or realized by cooperation of software and hardware.

Seventeenth Modified Example

In the above described respective embodiments, the display apparatus is the projector, however, not limited to that. For example, the above described respective embodiments may be applied to an LCD as the display apparatus. In this case, the image display unit is a liquid crystal screen.

The entire disclosure of Japanese Patent Application No. 2017-206888, filed Oct. 26, 2017 is expressly incorporated by reference herein.

What is claimed is:

1. A display apparatus comprising:

a plurality of input terminals capable of receiving image signals;

a first display part showing whether or not the input terminal accepts the image signal with respect to each input terminal of the plurality of input terminals, the first display part having a third display part with respect to each input terminal, the third display part indicating whether or not the input terminal corresponding to the third display part accepts the image signal, and the third display part being a first light emitting part;

an image display unit that displays an image according to the image signal received by a selected input terminal selected from the plurality of input terminals on a display surface;

a second display part showing the selected input terminal, the second display part having a fourth display part with respect to each input terminal, the fourth display part indicating whether or not the input terminal corresponding to the fourth display part is the selected input terminal, and the fourth display part being a second light emitting part;

a light emission control part that lights the first light emitting part when the input terminal corresponding to the first light emitting part accepts the image signal and lights the second light emitting part when the input terminal corresponding to the second light emitting part is the selected input terminal; and a lighting command receiving part that receives a lighting command to light the first light emitting part and the second light emitting part, wherein:

when the lighting command receiving part receives the lighting command, the light emission control part lights at least one of the first light emitting part corresponding to the input terminal not accepting the image signal and the second light emitting part corresponding to the input terminal not the selected input terminal in predetermined color, and the predetermined color in the first light emitting parts is a different color from a color of light emitted by the first light emitting part corresponding to the input terminal accepting the image signal, and the predetermined color in the second light emitting part is a different color from a color of light emitted by the second light emitting part corresponding to the selected input terminal.

2. The display apparatus according to claim 1, wherein the third display part is a first light emitting part, and the display apparatus further comprises a first light emission control part that lights the first light emitting part when the input terminal corresponding to the first light emitting part accepts the image signal and extinguishes the first light emitting part when the input terminal corresponding to the first light emitting part does not accept the image signal.

3. The display apparatus according to claim 1, wherein the fourth display part is a second light emitting part, and the display apparatus further comprises a second light emission control part that lights the second light emitting part when the input terminal corresponding to the second light emitting part is the selected input terminal and extinguishes the second light emitting parts when the input terminal corresponding to the second light emitting part is not the selected input terminal.

4. The display apparatus according to claim 1, wherein the third display part is a first light emitting part, and the fourth display part is a second light emitting part, the display apparatus further comprises:

a light emission control part that lights the first light emitting part when the input terminal corresponding to the first light emitting part accepts the image signal and lights the second light emitting part when the input terminal corresponding to the second light emitting part is the selected input terminal; and an extinction command receiving part that receives an extinction command to extinguish the first light emitting part and the second light emitting part, and when the extinction command receiving part receives the extinction command, the light emission control part extinguishes the first light emitting part corresponding to the input terminal accepting the image signal and the second light emitting part corresponding to the selected input terminal.

5. The display apparatus according to claim 1, wherein the fourth display part is placed adjacent to the third display part corresponding to the input terminal corresponding to the fourth display part.

6. The display apparatus according to claim 1, further comprising a setting information receiving part that receives setting information representing one or more input terminals of the plurality of input terminals, wherein the third display part corresponding to the input terminal represented by the setting information stops indication as to whether the input terminal accepts the image signal.

7. The display apparatus according to claim 1, further comprising:

a determination part that determines whether or not each input terminal accepts the image signal; and a cycle information receiving part that receives cycle information representing a cycle in which whether or not the input terminal accepts the image signal is determined, wherein the determination part determines whether or not each input terminal accepts the image signal according to the cycle represented by the cycle information received by the cycle information receiving part.

8. The display apparatus according to claim 1, wherein the image signal contains a plurality of pieces of information on an image according to the image signal, further comprising a determination part that determines whether or not each input terminal accepts the image signal, the determination part determines that the input terminal accepts the image signal when the input terminal receives part of the plurality of pieces of information.

9. The display apparatus according to claim 1, further comprising a first generation part that generates image information representing an image showing whether or not each input terminal accepts the image signal, wherein the image display unit displays the image represented by the image information generated by the first generation part on the display surface.

10. The display apparatus according to claim 1, further comprising:

a second generation part that generates image information representing an image showing information on the image signal received by the input terminal; and a fifth display part that displays the image represented by the image information generated by the second generation part.

11. The display apparatus according to claim 1, further comprising a slot that enables insertion and ejection of a board, wherein the plurality of input terminals include an input terminal of the board inserted into the slot.

12. A control method for a display apparatus having a plurality of input terminals capable of receiving image signals, comprising:

showing, by a first display part, whether or not the input terminal accepts the image signal with respect to each input terminal of the plurality of input terminals, the first display part having a third display part with respect to each input terminal, the third display part indicating whether or not the input terminal corresponding to the third display part accepts the image signal, and the third display part being a first light emitting part;

displaying an image according to the image signal received by a selected input terminal selected from the plurality of input terminals on a display surface;

showing, by a second display part, the selected input terminal, the second display part having a fourth display part with respect to each input terminal, the fourth display part indicating whether or not the input terminal corresponding to the fourth display part is the selected input terminal, and the fourth display part being a second light emitting part;

lighting the first light emitting part when the input terminal corresponding to the first light emitting part accepts the image signal and lighting the second light emitting part when the input terminal corresponding to the second light emitting part is the selected input terminal; and receiving a lighting command to light the first light emitting part and the second light emitting part, wherein:

when the lighting command receiving part receives the lighting command, the light emission control part lights at least one of the first light emitting part corresponding to the input terminal not accepting the image signal and the second light emitting part corresponding to the input terminal not the selected input terminal in predetermined color, and the predetermined color in the first light emitting parts is a different color from a color of light emitted by the first light emitting part corresponding to the input terminal accepting the image signal, and the predetermined color in the second light emitting part is a different color from a color of light emitted by the second light emitting part corresponding to the selected input terminal.

* * * * *